(12) United States Patent
Blain et al.

(10) Patent No.: US 11,738,370 B2
(45) Date of Patent: Aug. 29, 2023

(54) CHUTE APPARATUS FOR SORTING SMALL OBJECTS, SUCH AS FRUIT

(71) Applicant: A & B Packing Equipment, Inc., Lawrence, MI (US)

(72) Inventors: Jonathan Robert Blain, Lawton, MI (US); Kody Nutting, Kalamazoo, MI (US); Robert L. Williamson, Hartford, MI (US)

(73) Assignee: A & B Packing Equipment, Inc., Lawrence, MI (US)

( * ) Notice: Subject to any disclaimer, the term of this patent is extended or adjusted under 35 U.S.C. 154(b) by 115 days.

(21) Appl. No.: 17/373,617

(22) Filed: Jul. 12, 2021

(65) Prior Publication Data

US 2023/0008977 A1 Jan. 12, 2023

(51) Int. Cl.
| | | |
|---|---|---|
| *B07B 13/04* | (2006.01) | |
| *B07B 13/10* | (2006.01) | |
| *B65G 11/00* | (2006.01) | |
| *B65G 11/08* | (2006.01) | |

(52) U.S. Cl.
CPC .............. *B07B 13/04* (2013.01); *B07B 13/10* (2013.01); *B65G 11/00* (2013.01); *B65G 11/081* (2013.01); *B07B 2220/00* (2013.01); *B65G 2201/0211* (2013.01)

(58) Field of Classification Search
CPC ..... B65G 11/081; B65G 11/086; B65G 11/00; B65G 2201/0211; B07B 13/04; B07B 13/10; B07B 2220/00
See application file for complete search history.

(56) References Cited

U.S. PATENT DOCUMENTS

| | | | | | |
|---|---|---|---|---|---|
| 246,435 | A | * | 8/1881 | Whitney ..................... | 193/27 |
| 791,477 | A | * | 6/1905 | Lathrop ..................... | 193/27 |
| 903,620 | A | * | 11/1908 | Tagliafero ............ | B65G 11/086 |
| | | | | | 193/27 |
| 3,231,110 | A | * | 1/1966 | Bossell .................. | B60P 1/6409 |
| | | | | | 193/27 |
| 3,732,961 | A | * | 5/1973 | Thornton ............. | B65G 69/165 |
| | | | | | 193/15 |
| 3,819,080 | A | * | 6/1974 | Bird ................... | B65D 81/3216 |
| | | | | | 426/118 |
| 4,779,760 | A | * | 10/1988 | Wittern ................... | G07F 11/34 |
| | | | | | 221/289 |
| 4,917,264 | A | * | 4/1990 | Gasiel ..................... | G07F 11/34 |
| | | | | | 221/124 |
| 5,397,025 | A | * | 3/1995 | Lee ...................... | B65G 59/066 |
| | | | | | 221/298 |
| 9,126,758 | B2 | * | 9/2015 | Kennedy ................ | B65G 47/44 |
| 2012/0308348 | A1 | * | 12/2012 | Gelli .................. | B65G 47/5113 |
| | | | | | 414/293 |

* cited by examiner

*Primary Examiner* — Mark A Deuble
(74) *Attorney, Agent, or Firm* — The Watson IP Group, PLC; Jovan N. Jovanovic (57) ABSTRACT

A chute apparatus is comprised of a guide member, an arched member, and a floor member. The guide member guides an object entering the chute apparatus. The arched member receives the object from the guide member and redirects the object toward an exit port of the chute apparatus. The floor member receives the object from the arched member and directs the object toward the exit port of the chute apparatus. It is contemplated that the object may comprise a fruit, such as a berry or the like.

14 Claims, 11 Drawing Sheets

CHUTE APPARATUS FOR SORTING SMALL OBJECTS, SUCH AS FRUIT

CROSS-REFERENCE TO RELATED APPLICATION

NA

BACKGROUND OF THE DISCLOSURE

1. Field of the Disclosure

The disclosure relates in general to a chute apparatus, and more particularly, to a chute apparatus for a sorting and packaging device. While the device is very applicable for sorting small objects such as fruit, and more particularly, for blueberries, the use there of is not limited to blueberries or to fruit, and a number of different applications are contemplated.

2. Background Art

Fruit sales in the U.S. alone are a multi-billion-dollar business. Such fruit includes among other things, berries, and smaller fruit such as raspberries, strawberries, blueberries, cherries, cherry tomatoes, grapes, etc. To maximize shelf life before being consumed and to present consumers with a desirable product to encourage purchase, it is desirable to minimize and/or eliminate any damage to the objects. Indeed, limiting damage to a minimum to maximize profits.

In many instances it is necessary to sort such fruit in sorting equipment. Typically, such sorting equipment will sort fruit by moving fruit from one conveyor to another based on properties. Often, in this transfer, damage can occur as the fruit may be forcefully directed from one conveyor (or area) to another conveyor (or area) at higher speeds and with strong changes indirection. It is desirable to have such changes occur with minimal damage to the fruit.

Again, it will be understood that the apparatus of the present disclosure is not limited to use with fruit, much less the fruit that is identified herein, but can be utilized in any number of different applications, food related or otherwise, wherein sorting or the like, typically, of objects which can be damaged through sorting, is contemplated

SUMMARY OF THE DISCLOSURE

The disclosure is directed to a chute apparatus comprising a guide member, an arched member, and a floor member. The guide member guides an object entering the chute apparatus. The arched member receives the object from the guide member and redirects the object toward an exit port of the chute apparatus. The floor member receives the object from the arched member and directs the object toward the exit port of the chute apparatus.

In at least one configuration, the guide member and the floor member are disposed substantially horizontally.

In at least one configuration, the chute apparatus is comprised of silicone.

In at least one configuration, the chute apparatus further comprises a stop member to stop the object as it leaves the floor member.

In at least one configuration, the stop member extends below the floor member.

In at least one configuration, the stop member is substantially rectangular in shape.

In at least one configuration, the chute apparatus further comprises a first sidewall disposed on a first side of the chute apparatus and a second sidewall disposed on a second side of the chute apparatus, the first and second sidewalls to maintain the object within the chute apparatus as the object traverses the guide member, the arched member, and the floor member.

In at least one configuration, the first and second sidewalls include first and second cutouts respectively, on an opposite side of the chute apparatus from the arched member, the first and second cutouts being sized to a size of a conveyor that is disposed within the first and second cutouts.

In at least one configuration, the guide member, the arched member, and the floor member are integrated.

In at least one configuration, the chute apparatus further comprises a plurality of indents disposed along a first side of the chute apparatus and a second side of the chute apparatus, the plurality of indents to secure the chute apparatus to a mounting frame.

In at least one configuration, the chute apparatus further comprises a first sidewall disposed on a first side of the chute apparatus and a second sidewall disposed on a second side of the chute apparatus, the floor member being coupled on a first end thereof to a second end of the first sidewall and on a second end thereof to a second end of the second sidewall.

In at least one configuration, the chute apparatus further comprises a first sidewall disposed on a first side of the chute apparatus, a second sidewall disposed on a second side of the chute apparatus, and a first narrowing member coupled to the floor member and a stop member, and a second narrowing member coupled to the floor member and the stop member, the first and second narrowing members to narrow the exit port.

In at least one configuration, the chute apparatus further comprises first and second mounting openings disposed on the first side of the chute apparatus, and third and fourth mounting openings disposed on the second side of the chute apparatus.

In at least one configuration, a system is comprised of the chute apparatus, the system further comprising a mounting frame into which the chute apparatus is removably coupled.

In at least one configuration, the mounting frame includes a handle.

In at least one configuration, a system is comprised of the chute apparatus, the system further comprising a conveyor disposed proximate to the chute apparatus, the object ejected from the conveyor into the chute apparatus.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
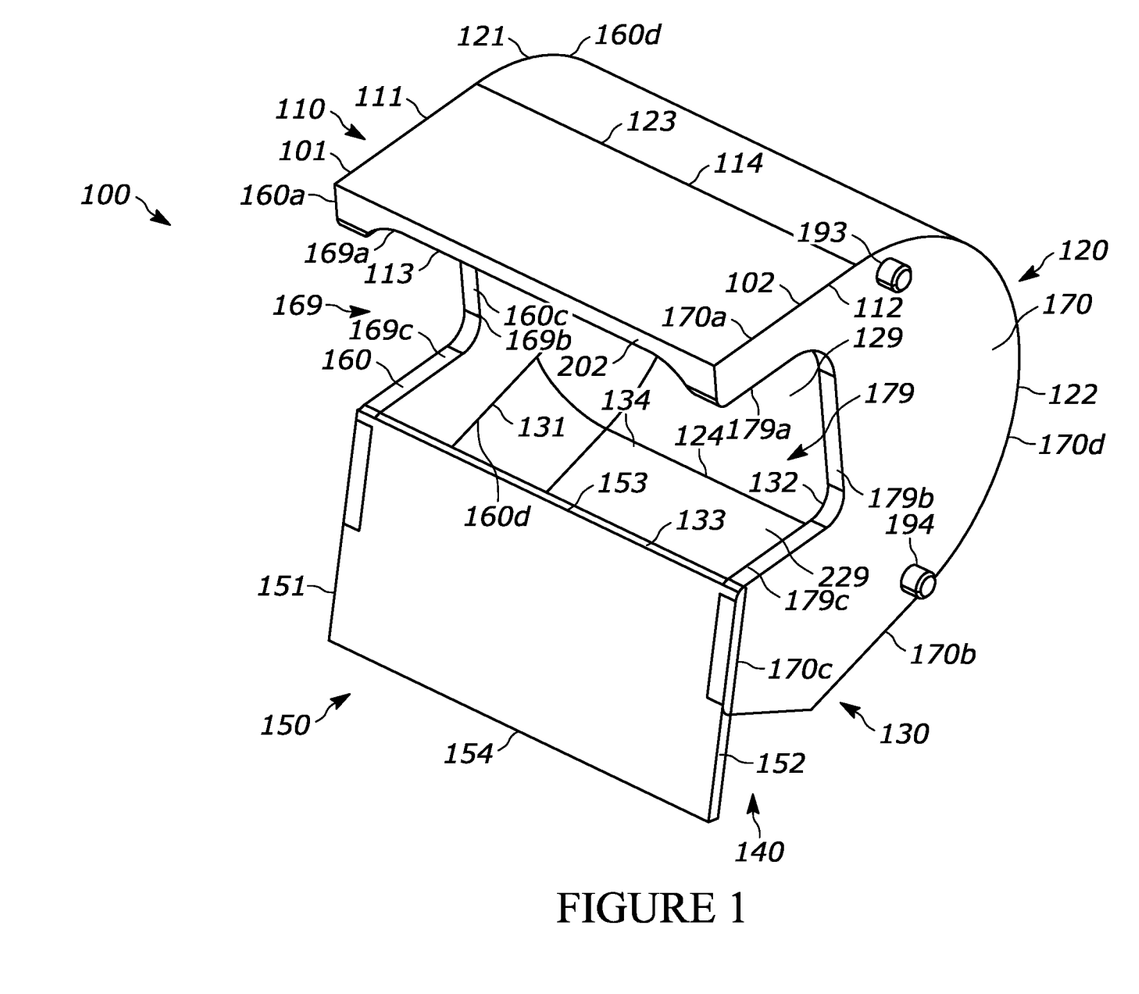
FIG. 1 illustrates an isometric view of an example chute apparatus, in accordance with at least one configuration disclosed herein.
Figure 2:
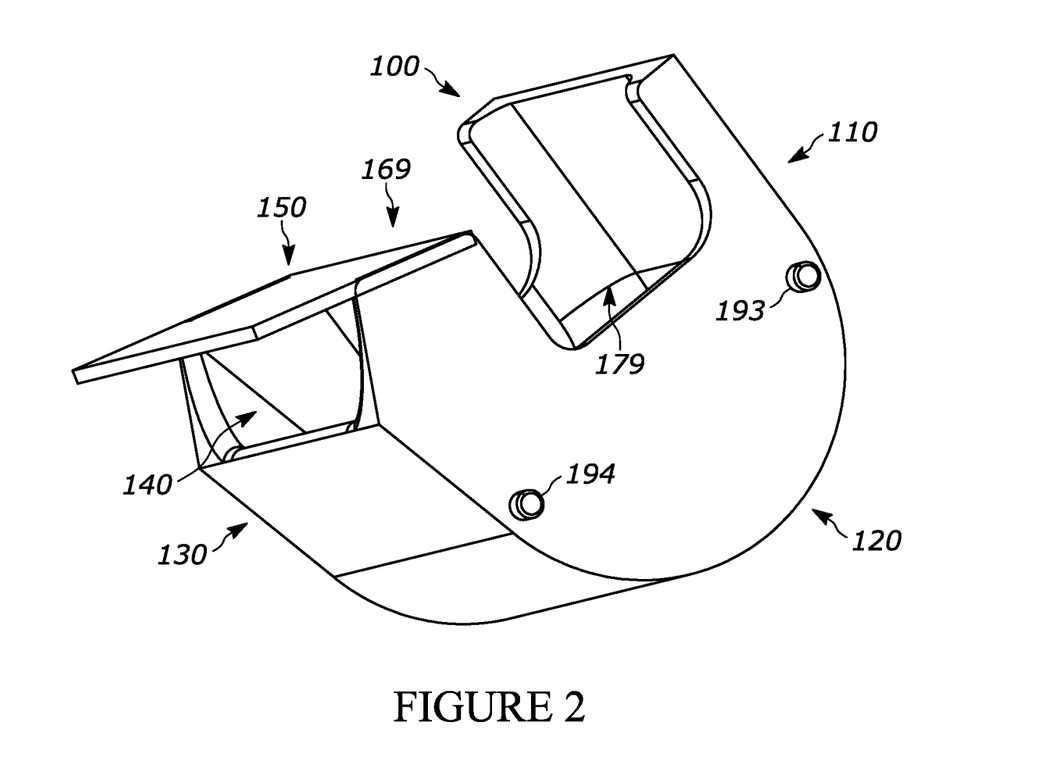
FIG. 2 illustrates another isometric view of the chute apparatus shown in FIG. 1, in accordance with at least one configuration disclosed herein.
Figure 3:
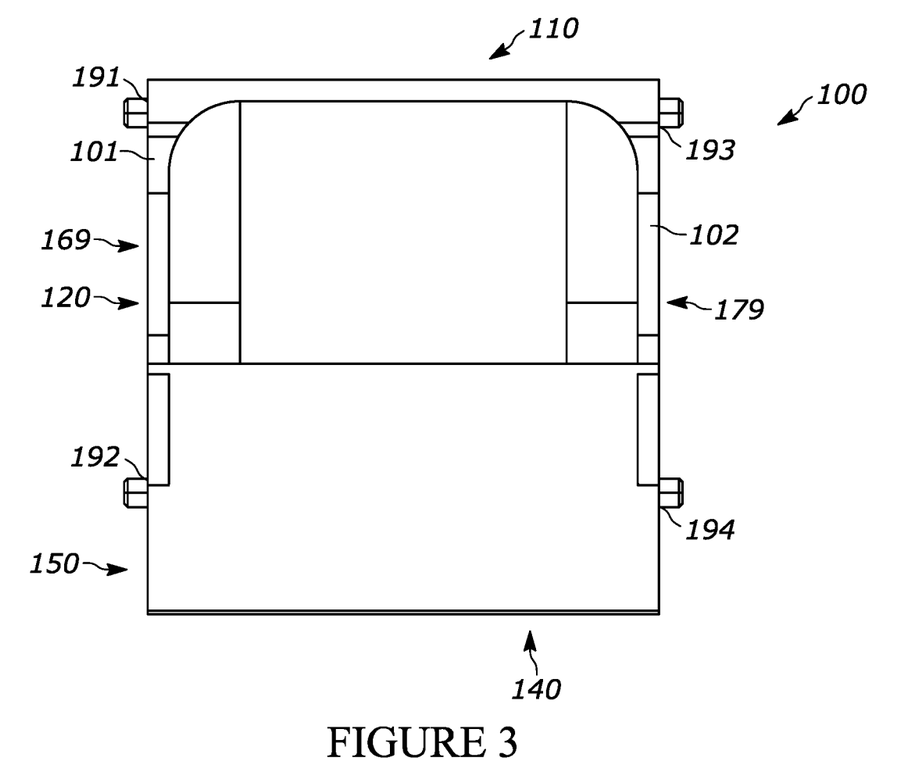
FIG. 3 illustrates a front view of the chute apparatus shown in FIG. 1, in accordance with at least one configuration disclosed herein.

Referring now to the drawings and in particular to FIG. 1, a chute apparatus is disclosed, such as chute apparatus 100. This chute apparatus 100 can be used to guide fruit 201 (FIGS. 9-11), such as raspberries, strawberries, blueberries, cherries, cherry tomatoes, or any other fruit, such as citrus fruit, as well as small objects that may or may not be food related, that can move along a path formed by the members described herein to another area, from a first location, such as a conveyor 910 (FIGS. 9-11) to another location, such as a packaging area (not shown) or even another conveyor (FIGS. 9-11), such as for size sorting. It will be understood that the disclosure is described with reference to fruit below, with the understanding that the disclosure is not limited thereto, but the reference to fruit is exemplary in nature.

Figure 7:
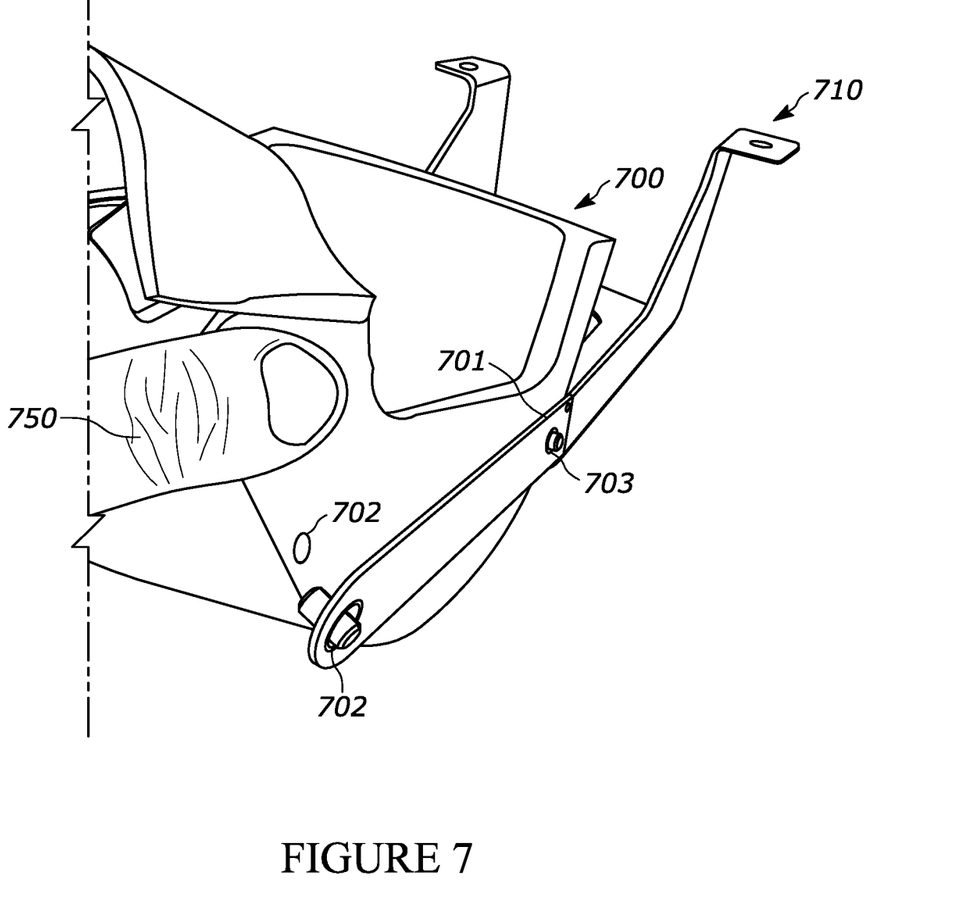
FIG. 7 illustrates an isometric view of yet another example chute apparatus being mounted onto a mounting frame, in accordance with at least one configuration disclosed herein.

As the fruit 201 is typically delicate and easily damaged, the chute apparatus 100 is made of a material that cushions the fruit 201 as it traverses the chute apparatus 100. In at least one configuration, the chute apparatus 100 is comprised of silicone, or a similar material. Silicone is relatively inexpensive to manufacture, similar to kitchen utensils, and allows for easy maintenance such as washing of the chute apparatus 100. Silicone is also relatively easily deformable to allow for easy coupling to a mounting frame 710, as shown in FIG. 7.

The chute apparatus 100 is comprised of a guide member 110, an arched member 120, and a floor member 130. In at least one configuration, the chute apparatus 100 the guide member 110, the arched member 120, and the floor member 130 are integrated, although in other configurations each can be a distinct member that are coupled together to form the chute apparatus 100. The guide member 110 is used to guide the fruit 201 on an inside surface 202 thereof as the fruit 201 enters the chute apparatus 100. The guide member 110 includes a first side 111, a second side 112, a front end 113 that points in a direction of the fruit 201 as it enters the chute apparatus 100, and a back end 114 that is coupled to the arched member 120. As the fruit 201 enters the chute apparatus 100, the guide member 110 prevents the fruit 201 from going over the chute apparatus 100, thereby maintaining the fruit 201 within the chute apparatus 100. As shown, the guide member 110 is rectangular in shape, wider than deep. However, in other configurations the guide member 110 can even be square in shape or even deeper than wide.

The arched member 120 receives the fruit 201 from the guide member 110 and redirects the fruit 201 on an inside surface 129 thereof toward an exit port 140 of the chute apparatus 100, that is redirects the fruit 201 to travel in an opposite direction from which the fruit 201 enters the arched member 120. The arched member 120 includes a first side 121, a second side 122, an arch start 123, and an arch end 124. The back end 114 of the guide member 110 is coupled to the arch start 123 of the arched member 120. A curvature of the arched member 120 is such that a direction of the fruit 201 is altered to direct the fruit 201 toward the exit port 140 of the chute apparatus 100. Depending upon how delicate the fruit 201 is, the curvature of the arched member 120 can be less or greater than that shown to either soften the change in direction of the fruit 201 or to speed movement of the fruit 201 through the chute apparatus 100. During typical packaging or moving fruit from a first conveyor to another conveyor, fruit is typically ejected (e.g., by compressed air) from the first conveyor toward a substantially vertical member that redirects the fruit. This vertical member results in the typical fruit being damaged. The arched member 120 at least mitigates such typical damage.

The floor member 130 receives the fruit 201 from the arched member 120 and directs the fruit 201 on an inside surface 229 thereof toward the exit port 140 of the chute apparatus 100. The floor member 130 includes a first side 131, a second side 132, a front end 133 that points in a direction of the fruit 201 as it exits the chute apparatus 100, and a back end 134 that is coupled to the arched member 120. The back end 134 of the floor member 130 is coupled to the arch end 124 of the arched member 120. As shown, the floor member 130 is rectangular in shape, wider than deep. However, in other configurations the floor member 130 can even be square in shape or even deeper than wide. During use of the chute apparatus 100, the guide member 110 and the floor member 130 are disposed substantially horizontally, although other angles are possible.

In at least one configuration the chute apparatus 100 further comprises a first sidewall 160 disposed on the first side 101 of the chute apparatus 100 and a second sidewall 170 disposed on the second side 102 of the chute apparatus 100. The first sidewall 160 includes a top edge 160a, a bottom edge 160b, a front edge 160c facing a direction of the exit port 140, and a back edge 160d that follows a contour of the arched member 120. Likewise, the second sidewall 170 includes a top edge 170a, a bottom edge 170b, a front edge 170c facing a direction of the exit port 140, and a back edge 170d that follows a contour of the arched member 120. The first and second sidewalls 160, 170 are coupled to the guide member 110, the arched member 120, and the floor member 130 on opposite sides thereof. The first and second sidewalls 160, 170 maintain the fruit 201 within the chute apparatus 100 as the fruit 201 traverses the guide member 110, the arched member 120, and the floor member 130, thereby maintaining contact between the fruit 201 and the guide member 110, the arched member 120, and the floor member 130 as the fruit 201 traverses the guide member 110.

In at least one configuration, the first and second sidewalls 160, 170 include first and second cutouts 169, 179, respectively, disposed on an opposite side of the chute apparatus 100 from the arched member 120, along the front edges 160c, 170c of the first and second sidewalls 160, 170, respectively. The first and second cutouts 169, 179 include a top edge 169a, 179a, a back edge 169b, 179b, and a bottom edge 169c, 179c, respectively. The first and second cutouts 169, 179 allow the cute apparatus 100 to be disposed over the conveyor 910 during use, shown in FIGS. 9-11. The first and second cutouts 169, 179 are sized to a size of the conveyor 910 that is disposed within the first and second cutouts 169, 179, such that the conveyor 810 does not contact the chute apparatus 100 during use. In the configuration shown, the first and second cutouts 169, 179 form a rectangular cutout, although other shapes are possible, such as oval, circular, square, or another other shape that allow the chute apparatus to be disposed over a conveyor.

In at least one configuration the chute apparatus 100 further comprises a stop member 150 to stop the fruit 201 as it leaves the floor member 130, and redirect the fruit 201 toward the exit port 140. As discussed above, the chute apparatus 100 is made of a material that cushions the fruit 201, with the stop member 150 flexing to remove the momentum of the fruit 201 as it contacts the stop member 201, thereby at least mitigating damage to the fruit 201. The stop member 150 includes a first side 151, a second side 152, a top end 153 that points in a direction of the guide member 110, and a bottom end 154 points in a same direction of the exit port 140.

Figure 4:
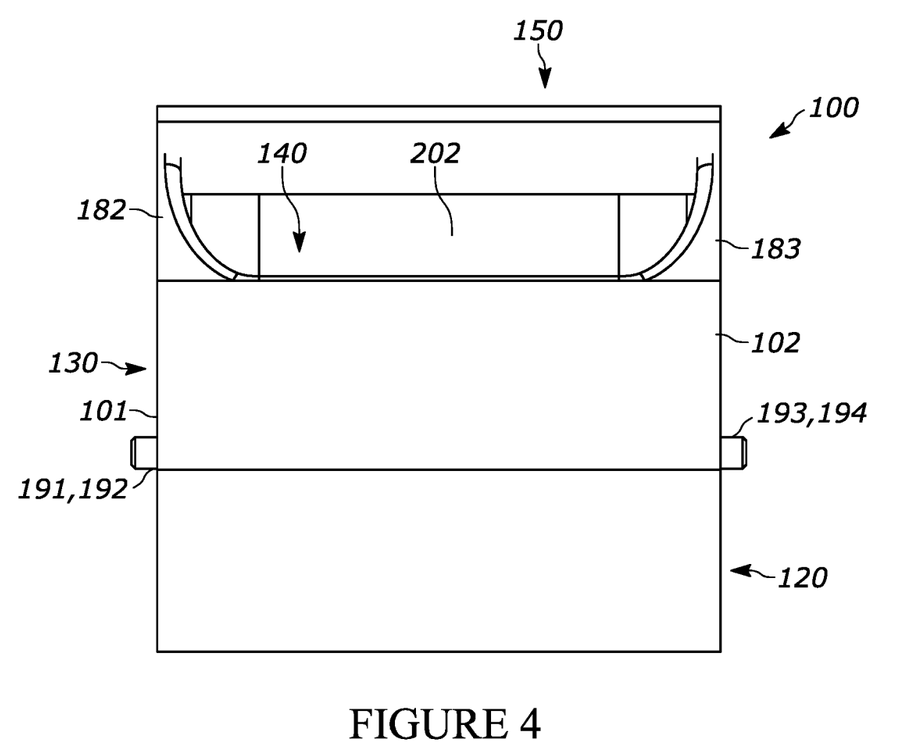
FIG. 4 illustrates a bottom view of the chute apparatus shown in FIG. 1, in accordance with at least one configuration disclosed herein.

As shown, the stop member 150 is rectangular in shape, wider than tall. However, in other configurations the stop member 150 can even be square in shape or even taller than wide. In at least one configuration, the stop member 150 extends below the floor member 130, as shown. In at least one configuration, the stop member 150 is coupled to the first and second sidewalls 160, 170 at an angle (e.g., approximately 20 degrees) such that the fruit 201 does not strike the stop member 150 perpendicularly, but is deflected by the stop member 150 at an angle which at least further mitigates damage to the fruit 201. In at least one configuration, a first narrowing member 182 is coupled to the floor member 130 and the stop member 150, as shown in FIG. 4, and a second narrowing member 183 coupled to the floor member 130 and the stop member 150. The first and second narrowing members 182, 183 narrow the exit port 140 to keep the fruit 201 exiting the exit port 140 within a confined area.

Figure 5:
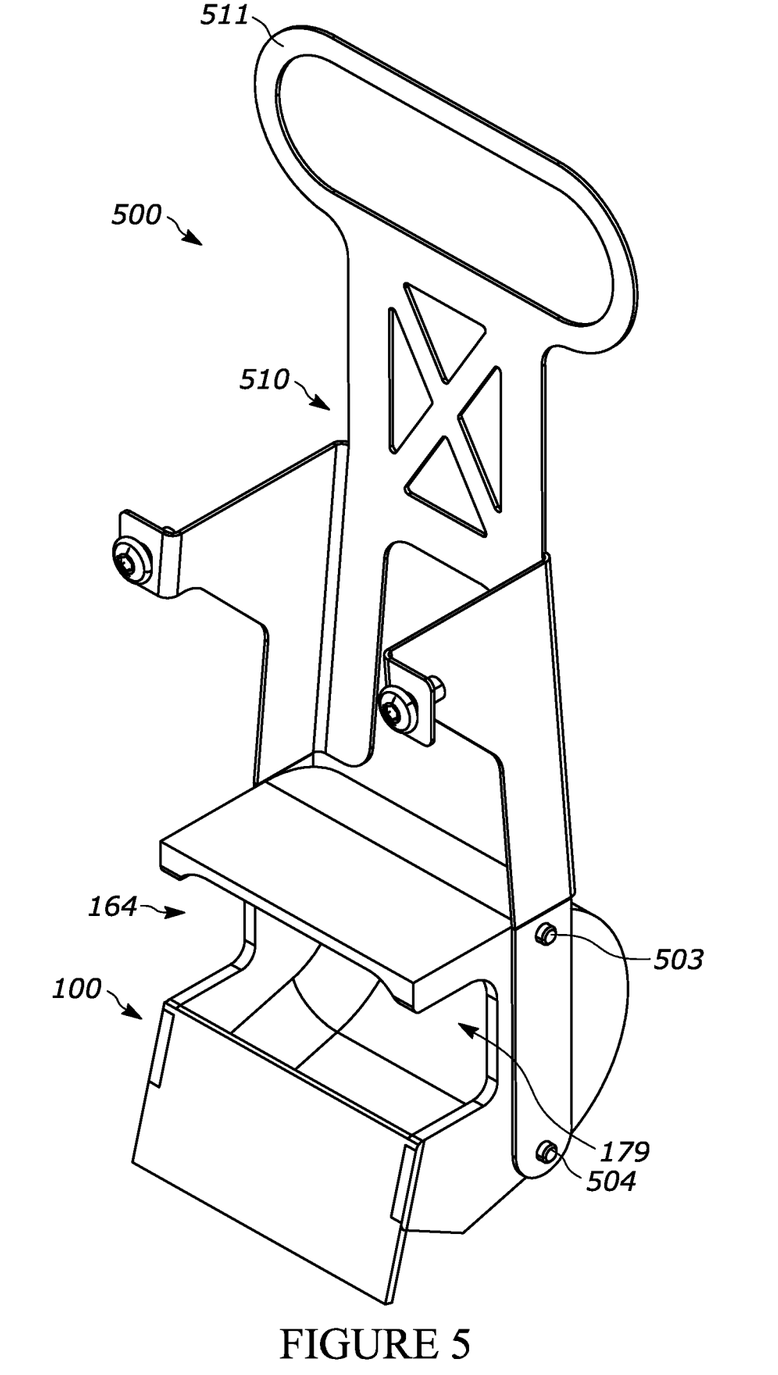
FIG. 5 illustrates the chute apparatus shown in FIG. 1 mounted onto a mounting frame, in accordance with at least one configuration disclosed herein.

The chute apparatuses disclosed herein can be mounted to a mounting frame in various ways. In at least one configuration, the chute apparatus 100 is shown as including four mounting openings 191, 192, 193, 194 (e.g., blind holes), shown with posts that can be coupled (e.g., welded) to a mounting frame, such as mounting frame 510 (FIG. 5). First and second mounting openings 191, 192 are disposed on the first side 101 of the chute apparatus 100, and the third and fourth mounting openings 193, 194 disposed on the second side 102 of the chute apparatus 100. As shown in FIG. 5, fasteners 503, 504 can be used through the mounting frame 510 into the mounting openings 193, 194 to removably couple the chute apparatus 100 to the mounting frame 510, the chute apparatus 100 and the mounting frame 510 thereby forming a system 500. Likewise, on the opposite side of the chute apparatus 100, addition fasteners (not shown) can be used to secure the chute apparatus 100 to the mounting frame 510. The mounting frame 510 can then be coupled to the conveyor 910 such that the first and second cutouts 169, 179 align with the conveyor 910, as shown. In at least one configuration the conveyor 910 and the chute apparatus 100 together form a system 900. In at least one configuration, the mounting frame 510 includes a handle 511 for easy transport of the mounting frame 510 and chute apparatus 100. In at least one other configuration, the mounting frame 710 lacks a handle.

Figure 6:
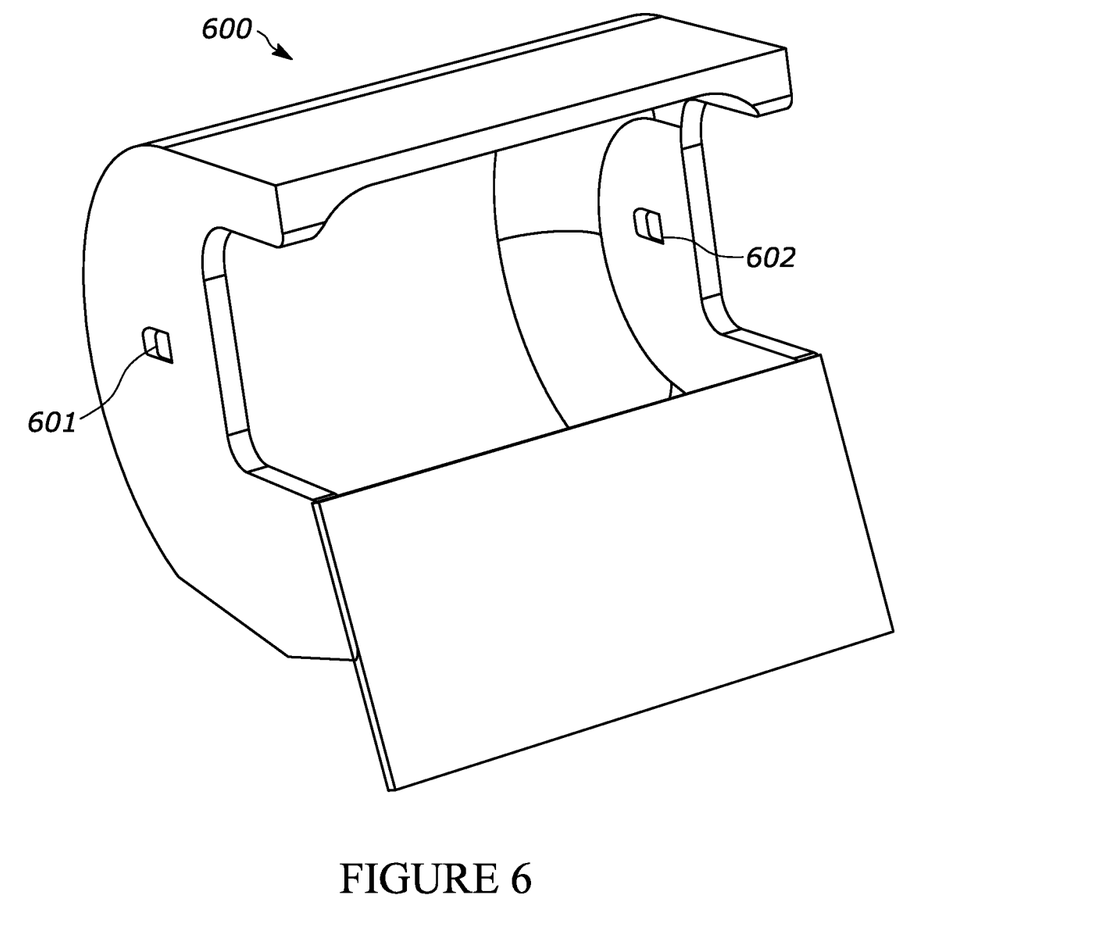
FIG. 6 illustrates an isometric view of another example chute apparatus, in accordance with at least one configuration disclosed herein.
Figure 8:
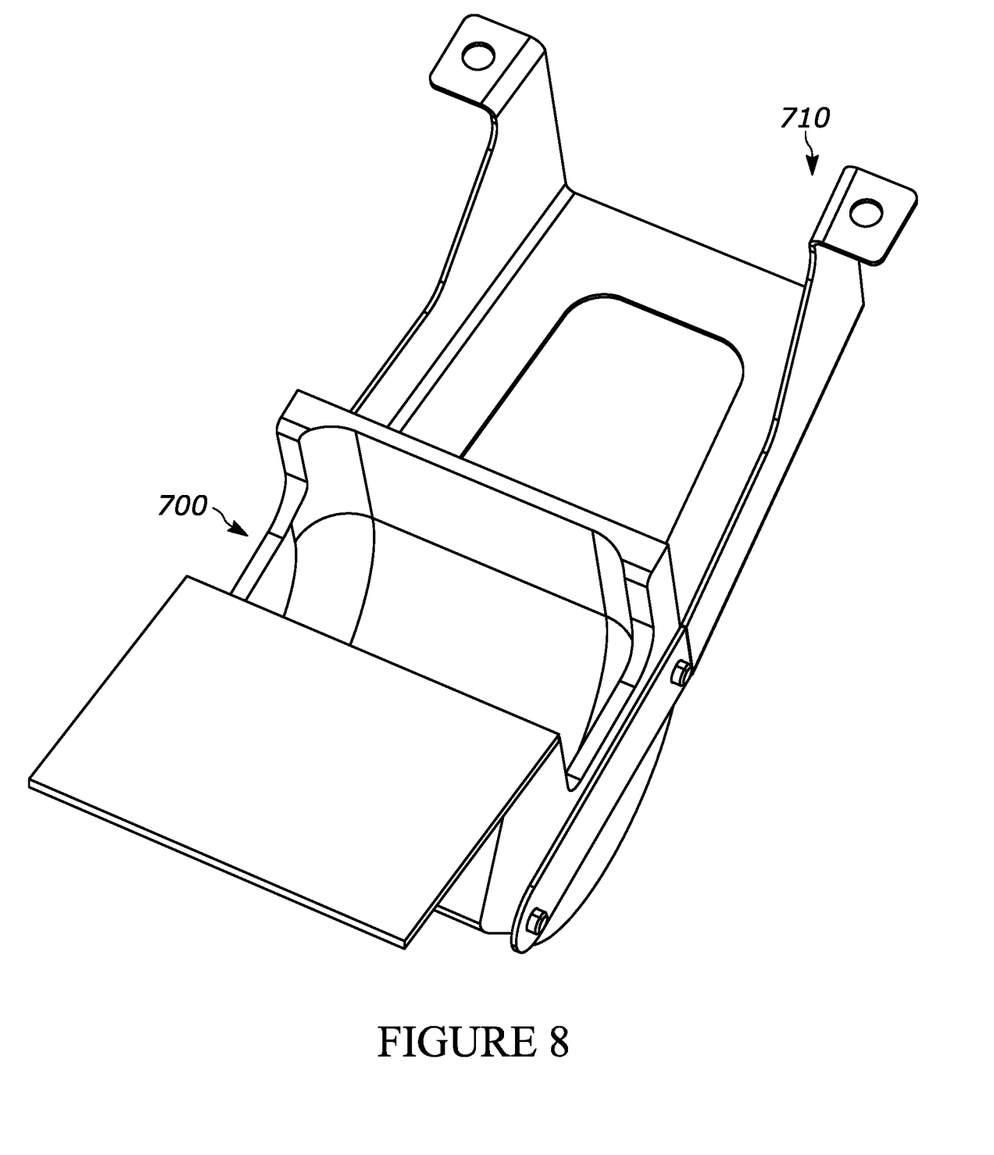
FIG. 8 illustrates an isometric view of the chute apparatus shown in FIG. 7 after having being mounted onto the mounting frame, in accordance with at least one configuration disclosed herein.

Again referring to FIG. 7, another example of a chute apparatus referenced as chute apparatus 700 includes indents that only partially extend into the chute apparatus 700, such as the circular indents 701, 702 (with likewise two additional indents on an opposite side of the chute apparatus 700, not shown) disposed proximate to a top and bottom of sides of the chute apparatus 700. To mount the chute apparatus 700 to the mounting frame 710, as shown a hand 750 can be used to grasp and apply squeezing pressure to the sides of the chute apparatus 700 and align the indents 701, 702 with posts 703, 704, respectively, coupled to the mounting frame 710. Relieving the squeezing pressure allow the chute apparatus 700 to return to its original shape, thereby coupling the chute apparatus 700 to the mounting frame 710, as shown in FIG. 8. As the chute apparatus 700 includes indents 701, 702, should the fruit 201 release any fruit juice within the chute apparatus 700, such fruit juice will be maintained within the chute apparatus 700, at least mitigating spatter outside of the chute apparatus 700 and facilitating easy washing of an interior of the chute apparatus 700. Another alternate configuration for a chute apparatus is shown in FIG. 6 in which a chute apparatus 600 is shown as including square mounting openings 601, 602 on both sides of the chute apparatus 600. These square mounting opening 601, 602 align with square posts (not shown) on a mounting frame (not shown).

During use of the chute apparatus 100, 600, 700, the chute apparatus 100, 600, 700 are coupled to a mounting frame, such as the mounting frames 510, 710. The mounting frame is then coupled (e.g. bolted) to a conveyor frame (not shown) that disposes the chute apparatus 100, 600, 700 over the conveyor 910, as discussed above. The conveyor 910 transports the fruit 201 to a location at which the chute apparatus 100, 600, 700 are located. At that point the fruit 201 is removed from the conveyor 910, typically ejected via compressed air, and in accordance with the configurations disclosed herein into the chute apparatus 100, 600, 700, as discussed above.

Figure 9:
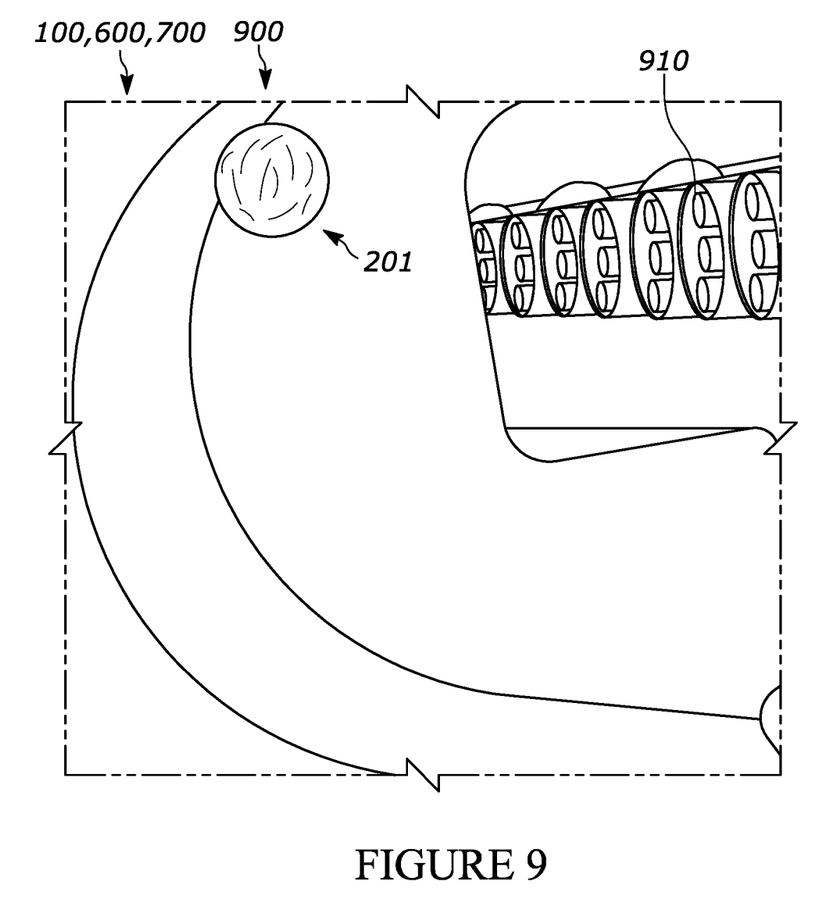
FIG. 9 illustrates a view from within any of the chute apparatus shown in FIGS. 1-8 as an object (such as a fruit like a berry) begins traversing an arched member of any of the chute apparatus, in accordance with at least one configuration disclosed herein.
Figure 10:
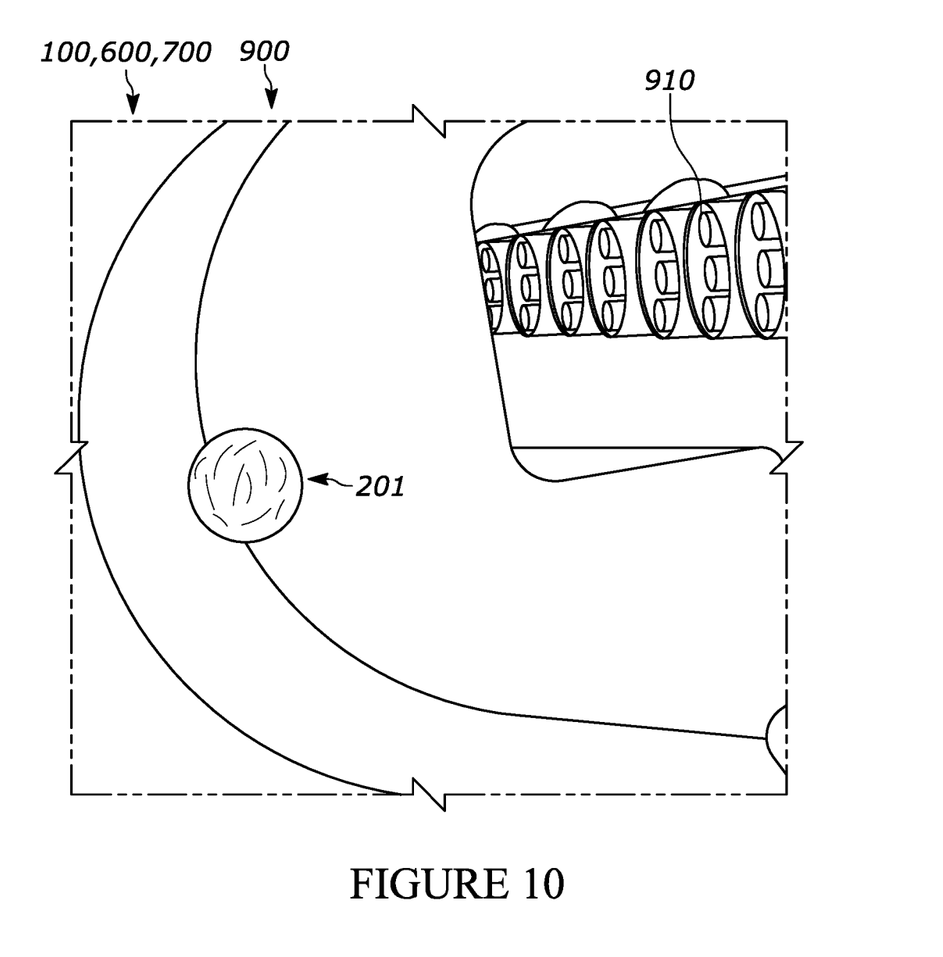
FIG. 10 illustrates the view from within any of the chute apparatus shown in FIG. 9 as the fruit continues traversing the arched member, in accordance with at least one configuration disclosed herein.
Figure 11:
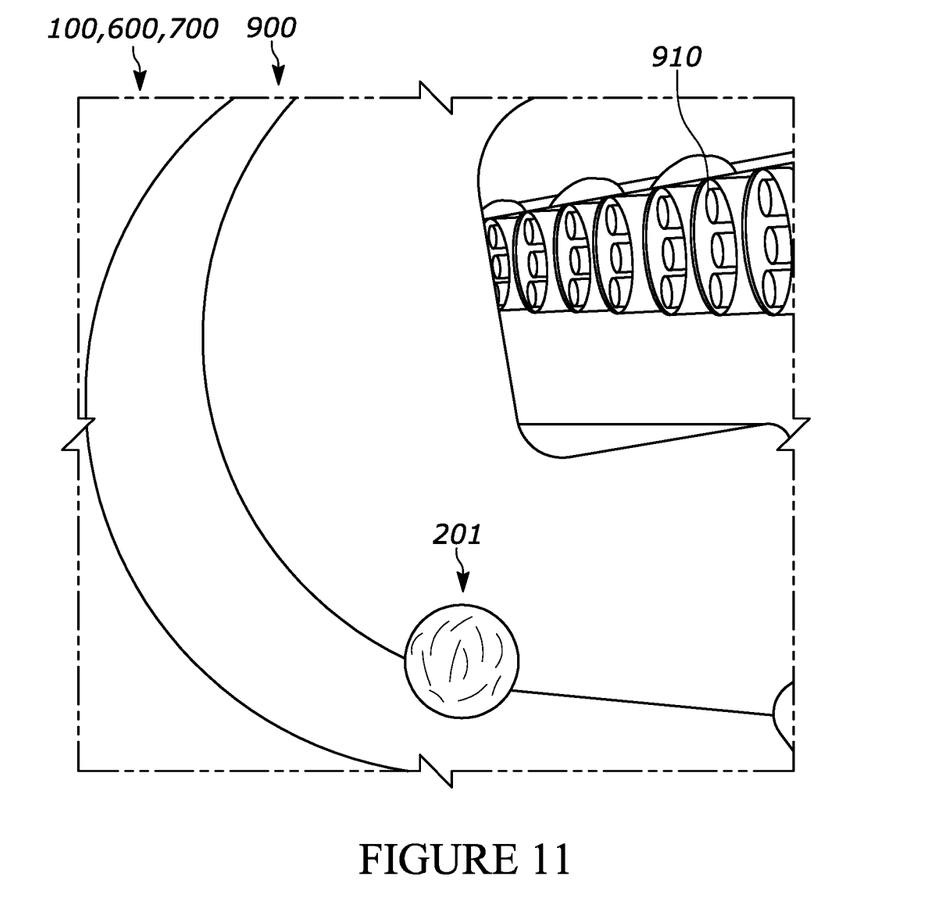
FIG. 11 illustrates the view from within any of the chute apparatus shown in FIG. 9 as the fruit even further continues traversing the arched member, in accordance with at least one configuration disclosed herein.

FIG. 9 shows an interior of the chute apparatus 100, 600, 700 after the fruit 201 has already pass across the guide member 110, shown as beginning to roll across the inside surface 129 of the arched member 120. FIG. 10 shows the interior of the chute apparatus 100, 600, 700 after the fruit 201 continues to roll closer to the exit port 140. FIG. 11 shows the interior of the chute apparatus 100, 600, 700 after the fruit 201 even further continues to roll closer to the exit port 140, with the fruit 201 shown as being proximate to the exit port 140.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A chute apparatus, comprising:
a guide member to guide an object entering the chute apparatus;
an arched member to receive the object from the guide member and redirect the object toward an exit port of the chute apparatus; and
a floor member to receive the object from the arched member and direct the object toward the exit port of the chute apparatus;
wherein the chute apparatus further comprises a first sidewall disposed on a first side of the chute apparatus and a second sidewall disposed on a second side of the chute apparatus, the first and second sidewalls including first and second cutouts respectively, the cutouts being on an opposite side of the chute apparatus from the arched member and the cutouts being sized to a size of a conveyor that is disposed within the first and second cutouts.

2. The chute apparatus according to claim 1, wherein the guide member and the floor member are disposed substantially horizontally.

3. The chute apparatus according to claim 1, wherein the chute apparatus is comprised of silicone.

4. The chute apparatus according to claim 1, further comprising a stop member to stop the object as it leaves the floor member.

5. The chute apparatus according to claim 4, wherein the stop member extends below the floor member.

6. The chute apparatus according to claim 4, wherein the stop member is substantially rectangular in shape.

7. The chute apparatus according to claim 1, wherein the guide member, the arched member, and the floor member are integrated.

8. The chute apparatus according to claim 1, further comprising a plurality of indents disposed along a first side of the chute apparatus and a second side of the chute apparatus, the plurality of indents to secure the chute apparatus to a mounting frame.

9. The chute apparatus according to claim 1, wherein the floor member is coupled on a first end thereof to a second end of the first sidewall and on a second end thereof to a second end of the second sidewall.

10. The chute apparatus according to claim 1, further comprising a first narrowing member coupled to the floor member and a stop member, and a second narrowing member coupled to the floor member and the stop member, the first and second narrowing members to narrow the exit port.

11. The chute apparatus according to claim 1, further comprising first and second mounting openings disposed on the first side of the chute apparatus, and third and fourth mounting openings disposed on the second side of the chute apparatus.

12. A system comprised of the chute apparatus according to claim 1, the system further comprising a mounting frame into which the chute apparatus is removably coupled.

13. The system according to claim 12, wherein the mounting frame includes a handle.

14. A system comprised of the chute apparatus according to claim 1, the system further comprising a conveyor disposed proximate to the chute apparatus, the object being ejected from the conveyor into the chute apparatus.

* * * * *